(12) United States Patent
Neville (10) Patent No.: US 8,131,526 B2
(45) Date of Patent: Mar. 6, 2012

(54) SYSTEM AND METHOD FOR EVALUATING PETROLEUM RESERVOIR USING FORWARD MODELING

(75) Inventor: Thomas J. Neville, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1027 days.

(21) Appl. No.: 11/787,418

(22) Filed: Apr. 14, 2007

(65) Prior Publication Data

US 2008/0255816 A1 Oct. 16, 2008

(51) Int. Cl.
*G06G 7/48* (2006.01)
(52) U.S. Cl. ........................................................ 703/10
(58) Field of Classification Search .................... 703/10
See application file for complete search history.

(56) References Cited

U.S. PATENT DOCUMENTS

| | | | |
|---|---|---|---|
| 6,294,917 | B1 | 9/2001 | Nichols |
| 6,393,363 | B1 | 5/2002 | Wilt et al. |
| 2008/0077371 | A1* | 3/2008 | Yeten et al. ................. 703/10 |

OTHER PUBLICATIONS

Sam Subbey et al., "A strategy for rapid quantification of uncertainty in reservoir performance prediction", 2003, Society of Petroleum Engineers paper SPE 79678, pp. 1-12.*
K.J. Tyler et al., "Faster history matching and uncertainty in predicted production profiles with stochastic modeling", 1993, Society of Petroleum Engineers paper SPE 26420, pp. 31-43.*
Harun Ates et al., "Ranking and Upscaling of Geostatistical Reservoir Models Using Streamline Simulation: A Field Case Study," 2003, Society of Petroleum Engineers, paper SPE 81497, pp. 1-10.*
Geoff Bohling, "Stochastic simulation and reservoir modeling workflow," Oct. 2005, http://people.ku.edu/~gbohling/cpe940/Simulation.pdf, pp. 1-20.*
Clayton V. Deutsch et al., "Improved reservoir management through ranking stochastic reservoir models," 1996, Society of Petroleum Engineers, paper SPE/DOE 35411, pp. 105-113.*
Ajay K. Samantray et al., "Upscaling and 3D streamline screening of several multi-million cell earth models for flow simulation," 2003, Society of Petroleum Engineers, paper SPE 81496, pp. 1-8.*
Y. Wang et al., "A streamline approach for ranking reservoir models that incorporates production history," 2002, Society of Petroleum Engineers, paper SPE 77377, pp. 1-19.*
Y. Wang et al., "Integrating production history into reservoir models using streamline-based time-of-flight ranking," 2002, in Heavy and Thermal Oil Recovery Production Mechanisms Annual Report, pp. 229-259.*
H.H. Haldorsen and E. Damsleth, Stochastic Modeling, Journal of Petroleum Technology, 42(4), SPE 20321, 1990, p. 404-412.
Lars Holden, Henning Omre, Hikon Tjelmeland, Integrated Reservoir Description, SPE 24261, 1992, p. 15-23.

(Continued)

*Primary Examiner* — Paul Rodriguez
*Assistant Examiner* — Russ Guill
(74) *Attorney, Agent, or Firm* — Jianguang Du; Hoffman Warnick LLC (57) ABSTRACT

This invention relates to petroleum reservoir characterization. It uses a novel system and method to generate a system of reservoir models, and then use a series of simulation techniques to simulate the models. The models are refined through each simulation and comparison step by comparing the results of the simulation with the known data from the reservoir. The invention can be applied to different reservoirs which have different known properties. Simulation techniques such as EM test forward calculation, stochastic reservoir modeling, streamline forward calculation are all candidates of simulation methods disclosed in the invention.

22 Claims, 5 Drawing Sheets

OTHER PUBLICATIONS

E. Damsleth and H. Omre, Geostatistical Approaches in Reservoir Evaluation, Journal of Petroleum Technology, 49(5), SPE37681, 1997, p. 498-501.

A. Datta-Gupta, Streamline Simulation: A Tehcnology Update, Journal of Petroleum Technology, 52(12), SPE65804, 2000, p. 68-73.

R.O. Baker, F. Kuppe, S. Chugh, R. Bora, S. Stojanovic and R. Batycky, Full-Field Modeling Using Streamline-Based Simulation: 4 Case Studies, SPE Reservoir Simulation Symposium, SPE66405, 2001.

M. Wilt, H.F. Morrison, H.W. Tseng, K. Lee, C. Torres-Verdin and D. Alumbaugh, Crosshole Electromagnetic Tomography: A New Technology for Oil Field Characterization, The Leading Edge, Mar. 1995, p. 173-177.

T. Patzek, M. Wilt and G.M. Hoversten, Using Crosshole Electromagnetics (EM) for Reservoir Characterization and Waterflood Monitoring, 2000 SPE Permian Basin Oil and Gas Recovery Conference, SPE59529.

\* cited by examiner

SYSTEM AND METHOD FOR EVALUATING PETROLEUM RESERVOIR USING FORWARD MODELING

FIELD OF THE INVENTION

The disclosure relates in general to petroleum reservoir, and more particularly to system and method for evaluating petroleum reservoir.

BACKGROUND OF THE INVENTION

Cross well electromagnetic tomography ("EM") has been available as a reservoir evaluation technology for approximately fifteen years. To obtain cross well electromagnetic tomography data, one needs to locate a receiver in one well and a transmitter in another well. The receiver would stay at one depth while the transmitter travels up and down the well while transmitting electromagnetic signals. The receiver receives the signal and transmits the signal up to the surface, where the received signal is recorded against the depth of both the transmitter and the receiver. The receiver would then be moved to another depth and the transmitter again travels up and down the well transmitting signals to be received by the receiver. At the end of an EM log, the recorder would have recorded a complete set of measurement response corresponding to the receiver and the transmitter each at different depths.

The recorded raw measurement response, however, are not useful on their own. To make use of the measurement response, one must recreate a reservoir model with characteristics that make sense to the engineer. According to the prior art, one needs to use the inversion method to obtain data of any practical use. To do so one needs to create a cellular model of resistivity distribution, commonly based on borehole resistivity measurements. A tool response forward model is then applied to this cellular model to predict the measurement apparatus response. The predicted measurement apparatus response is then compared to the actual measurement response obtained from the EM log, and the cellular model is then modified. The modification is made on the resistivity values at each of the blocks of the cellular model. In order to make an appropriate modification to the reservoir property values, the optimization formulation of the cellular model must be capable of calculating modification values to be added to or subtracted from each reservoir property value for each block of the cellular model. A tool response forward model is again applied to this cellular model to predict the measurement apparatus response. This process is repeated iteratively until the simulation "converges", or in other words, some cost function representing the actual measurement apparatus response and the predicted measurement apparatus response is optimized.

This known approach has at least three significant drawbacks. First of all, the inversion method is very computational intensive and time consuming. The forward calculation as well as the calculation of the modification values usually consume a large amount of the computer CPU power. Furthermore, multiple iterations are required to reach convergence or to exhaust the predetermined maximum number of iteration. Usually the larger the reservoir model, or the larger the difference between the reservoir property values of adjacent blocks, the longer it takes to obtain convergence.

Secondly, results of the inversion method could be misleading. The inversion method generally provides a single answer, which the inexperienced end user may consider a unique answer. In fact, most geophysical inversion processes are massively underdetermined. There are usually more than one "convergence points" in each mathematical reservoir model, and convergence at any of the convergence points may not necessarily reflect the truth of the reservoir properties. Thus the answer derived from the inversion process may be the answer that best matches the optimization mathematical criteria, but it does not necessarily reflect the physically correct answer. In addition, generally inversion schemes do not provide any information about the range of possible answers that may all be supported almost equally well by the measured data.

Thirdly, and most importantly, data obtained through the inversion method may not be useful for the reservoir engineer. The inversion method ultimately provides a two- or three-dimensional subsurface resistivity model or image. However, such a resistivity model is not useful in and of itself. Resistivity is not a property that a reservoir engineer can use to predict the reservoir performance in any meaningful way. A reservoir engineer normally uses data such as porosity, permeability, saturation, salinity, etc, which he can use to predict reservoir production performance or implement reservoir production plans. Resistivity is a function of reservoir properties such as porosity, saturation, and salinity. Thus a resistivity value corresponds to a large number of permutations of values of porosity, saturation, and salinity. Therefore resistivity is not a reservoir property that a reservoir engineer can use directly to predict reservoir performance or plan production management. The resistivity model obtained through the inversion method requires further interpretation to place it in a geological or reservoir engineering context. What makes the problem even worse is that resistivity is a function of several directly useful reservoir properties including porosity, water saturation, water salinity, etc. A reservoir engineer does not have any tool to guide him to obtain these useful reservoir properties from a resistivity value. The inversion scheme or inversion results do not provide any guidance on the important step of obtaining directly useful reservoir properties.

SUMMARY OF THE INVENTION

This invention describes a novel approach to the utilization of cross well electromagnetic tomography data, designed to address the three shortcomings described above. It relies on the appropriate application of three or more groups of steps of reservoir simulation. At each group of steps one simulates the reservoir system in a forward calculation process, compares the results of the simulation with field-obtained data, and selects the models that match the field-obtained data well. Each group of steps of the simulation refines the results of the prior group of steps of the simulation, and the final results would satisfy certain requirements of each and all of the steps of the simulation process. Thus the results are believed to be reasonably representative of the actual field.

In one group of steps, a family of three dimensional geo-cellular models is created with the help of stochastic reservoir modeling using the available data obtained during a well log operation, such as a well bore log. Once the models are established, calculation of the reservoir properties, such as the hydrocarbon volume of the reservoir, is calculated. The values are then compared with that of the actual field to find models that represents better matches with reality of the reservoir.

In a second group of steps, the reservoir models are simulated to calculate the production history of the reservoir, and the data so obtained are compared with field operation history. The models so obtained are used to carry out another group of step.

In yet another group of steps, the reservoir models are simulated for the resistivity tool response of an EM test process. The models that best represent the resistivity tool response are then used for reservoir engineering planning.

Other steps can be added to this process to further refine the models. In this process, most steps of simulation involved are forward calculation, thus the process is less CPU time demanding compared with the conventional EM inversion approach. The results of the simulation are actually useful reservoir properties, defined as original reservoir properties later in this patent, such as porosity, permeability, salinity, saturation. A reservoir engineer can use such properties to predict reservoir behavior.

BRIEF DESCRIPTION OF THE DRAWINGS

The disclosure is illustrated by way of example and not intended to be limited by the figures of the accompanying drawings in which like references indicate similar elements and in which.

DETAILED DESCRIPTION OF THE DISCLOSURE

Figure 1:
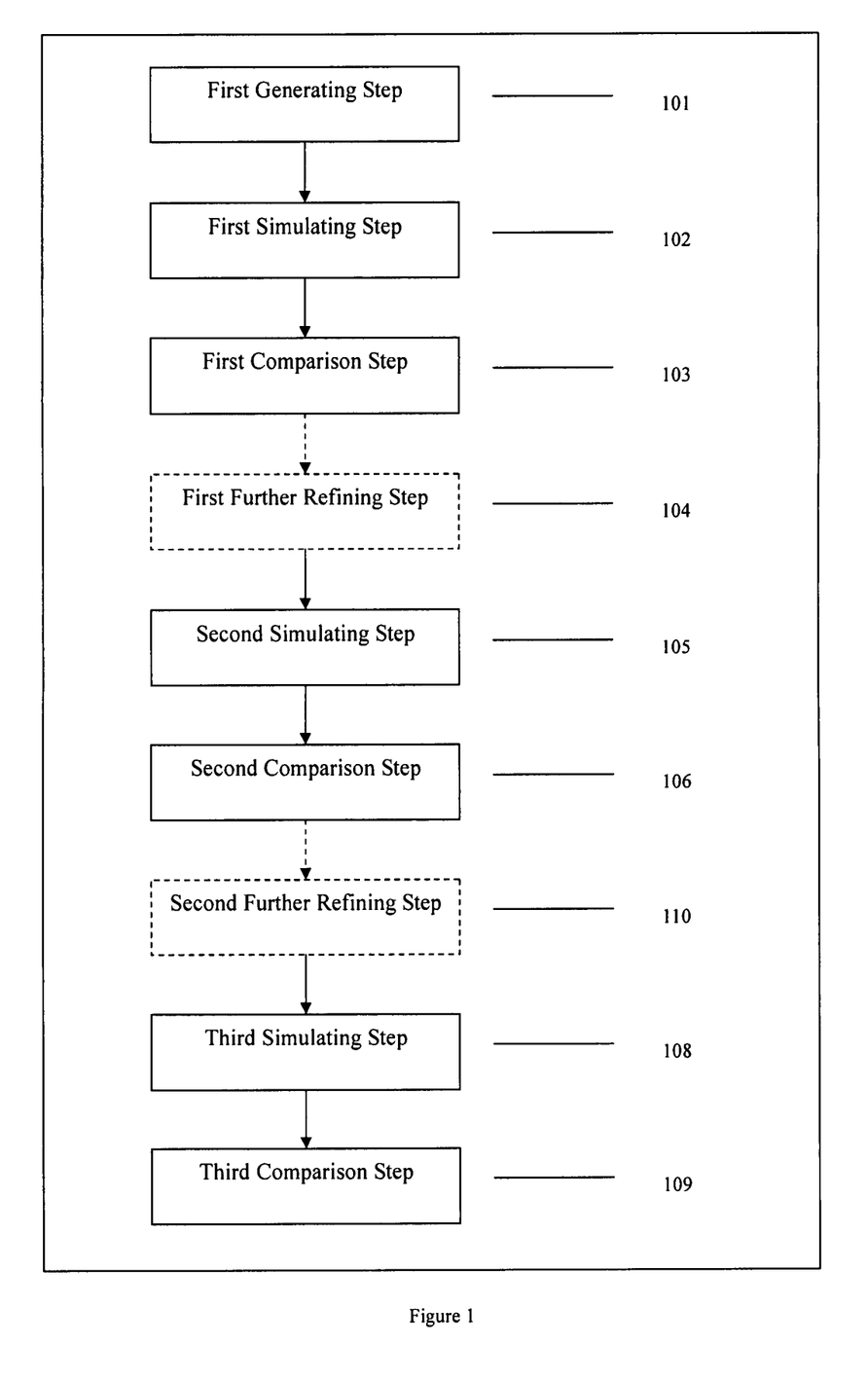
FIG. 1 is a schematic flowchart for the system and method of this invention.

FIG. 1 is a schematic flow chart of the steps of the system and method of this invention. According to the method and system of this invention, one needs to generate a first group of subsurface reservoir models. This step is shown as step 101 in FIG. 1. We define this step as the first generating step. The first group of subsurface reservoir models should be established using original reservoir properties. In this invention, an original reservoir property is defined as the property of the reservoir that a reservoir engineer can use in a conventional finite difference reservoir simulation program for calculating reservoir performance. Examples of original reservoir properties include porosity, permeability, oil saturation, gas saturation, water saturation and water salinity, pore structure, pore wettability, etc. Resistivity is not considered an original reservoir property within the definition of this invention.

Original reservoir properties for a reservoir differ from location to location, and at each location, from depth to depth. Thus one needs to use stochastic reservoir simulation to "guess" the original reservoir properties where the actual value is not available in order to establish the first group of reservoir models. Usually, once a well is drilled in the reservoir, the porosity, permeability, saturation (in this patent "saturation" may mean water saturation, oil saturation, gas saturation, etc), salinity, etc, at the well bore can be obtained through conventional well-log procedures. If more than one well is drilled in the same reservoir, then two sets of original reservoir properties would be obtained, each set at a different well location. With such original reservoir properties data, one can use statistical techniques of stochastic reservoir modeling such as interpolation and extrapolation to obtain original properties at locations where no well has been drilled. The following articles describe stochastic reservoir modeling and are incorporated herein by reference: HALDORSEN, H. et al, 1990: Stochastic modeling. Journal of Petroleum Technology, 42(4), pp 404-412, SPE20321. HOLDEN, L. et al, 1992: Integrated reservoir description. SPE European Petroleum Computer Conference, SPE24261. DAMSLETH, E. et al, 1997: Geostatistical approaches in reservoir evaluation. Journal of Petroleum Technology, 49(5), pp 498-501, SPE37681.

The geological structure of an oil reservoir is formed of solid particles such as sand grains and silt. Because the solid particles at a particular location and depth have a common origin, usually the properties of the solid particles, and thereby the properties of the pores, follow certain statistical rules such as Gaussian Distribution or Normal Distribution. This would allow the engineer to come up with a set of probable data for the original reservoir data. For example, assume the measured porosity at a certain location and depth is 0.150. Then in a close-by location and depth, a porosity value of between 0.140 and 0.160 is probable representation of the actual porosity. Thus based on this assumption, one can set up a group of subsurface reservoir models using plausible porosity values between 0.140 and 0.160. For example, one can use a group of porosities at 0.141, 0.142, 0.143 . . . 0.159, 0.160 etc. One can perform a similar manipulation of the other original reservoir data, such as permeability, salinity, saturation, etc. Upon completing this statistical procedure, a group of subsurface reservoir models can be established.

A reservoir model can be digitally represented in a digital reservoir simulator, where the reservoir is divided into many blocks. As each block (often representing a particular location and depth) has its own group of original reservoir data, the group of subsurface reservoir models has many members, each model representing a unique permutation of reservoir properties at each block.

Once the first group of subsurface reservoir models has been established, one may simulate each of the models to calculate a set of forecast reservoir data. We define this step the first simulation step. The first simulation step is shown as step 102 in FIG. 1. For example, once the first group of subsurface reservoir models has been established complete with porosity, pressure and saturation data, one may calculate the total volume of hydrocarbon in the reservoir. We define this result the first forecast reservoir data.

Among the members of the first group of subsurface reservoir models, some are more representative of the actual reservoir while others are less representative of the reservoir. Normally there are several members of the first group of subsurface reservoir models that represent the reservoir satisfactorily. For example, after comparing the values of the forecast reservoir data with the field-obtained reservoir data, one finds several members of the first group of subsurface reservoir models that are the best representation of the actual reservoir, one can use these several members of the first group of subsurface reservoir models as the second group of subsurface reservoir models.

Once the forecast reservoir data have been obtained, then it would be possible to compare the forecast reservoir data of each member of the group of subsurface reservoir models with the field-obtained reservoir data to find those members of the first group of subsurface reservoir models that most accurately represent the reservoir. In a following step, step 103 in FIG. 1, which we define as the first comparison step, we compare the first forecast reservoir data with a set of field-obtained data to rank the first group of subsurface reservoir models. For example, in a reservoir which already has produced X amount of hydrocarbon through its production history, a subsurface reservoir model that is calculated to contain any amount less than X would be considered not a good representation of the reservoir, and such a model may be discarded. These of the first group of underground reservoir models remaining after the first comparison step are defined as the second group of subsurface reservoir models.

Optionally once we obtained the second group of subsurface reservoir models, we may use the second reservoir simulation technique to simulate the second group of subsurface reservoir models to generate a second set of reservoir data. We define this step the second simulation step, which is indicated as step 105 in FIG. 1.

Figure 2:
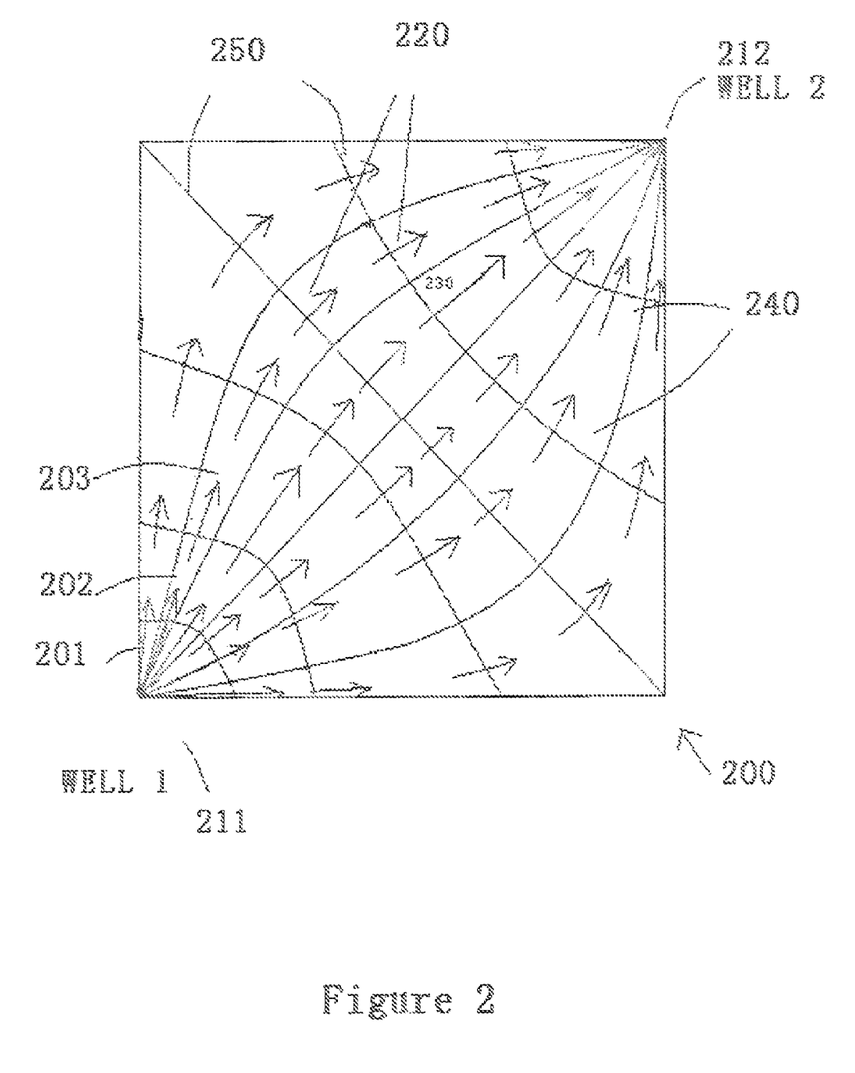
FIG. 2 illustrates a reservoir streamline system according to this invention.

The second reservoir simulation technique can be streamline simulation technique or another suitable reservoir simulation technique. FIG. 2 illustrates a reservoir structure simulated with streamline simulation technique according to this invention. The following articles described streamline simulation and are incorporated herein by reference: DATTA-GUPTA, A: Streamline simulation: a technology update. Journal of Petroleum Technology, 52(12), pp 68-73, SPE65604, 2000, and BAKER, R. et al: Full-field modeling using streamline-based simulation: 4 case studies. SPE Reservoir Simulation Symposium, SPE66405, 2001.

In FIG. 2, reservoir 200 is divided into blocks such as 201, 202, 203, etc. Arrows 220 each indicates a section of a streamline, and all arrows 220 together form an entire streamline. A streamline is a track that a fluid particle follows when flowing from one point to another. There are two wells, 211 and 212 each drilled at the corners of the reservoir. Lines 250 are equal-pressure lines along which the pressure remains constant.

In FIG. 2, fluid such as water or polymer solution is injected into well 211 and fluid such as gas, oil, or water or, more often, a combination thereof is produced from well 212. In another example according to this invention, the reservoir may have no injection wells and all wells are production wells. In another example according to this invention, multiple wells are drilled into the reservoir at different locations, and some of the wells are production wells while others are injection wells. In yet another example according to this invention, some wells are drilled into the reservoir at different locations, and all of the wells are production wells. These examples are not shown in the figures.

When the injection and the production in reservoir 200 is at a steady state, a fluid particle injected into well 211 follows a particular streamline such as the streamline indicated by arrows 220. The streamlines in a steady state system remains stable thus a steady state system is most suitable for streamline simulation. In a system not under steady state, the "streamline" migrates as time goes on. However, the streamline migration is minor when the reservoir system is under semi-steady state, or quasi-steady state. Where streamline migration becomes significant, streamline positions can be recomputed and the simulation continued with a new set of streamlines. Thus streamline simulation technique is suitable for all states of production of the reservoir as a second reservoir simulation technique. The terms steady state, semi-steady state and quasi-steady state have standard definitions in the profession of petroleum reservoir engineering.

Figure 3:
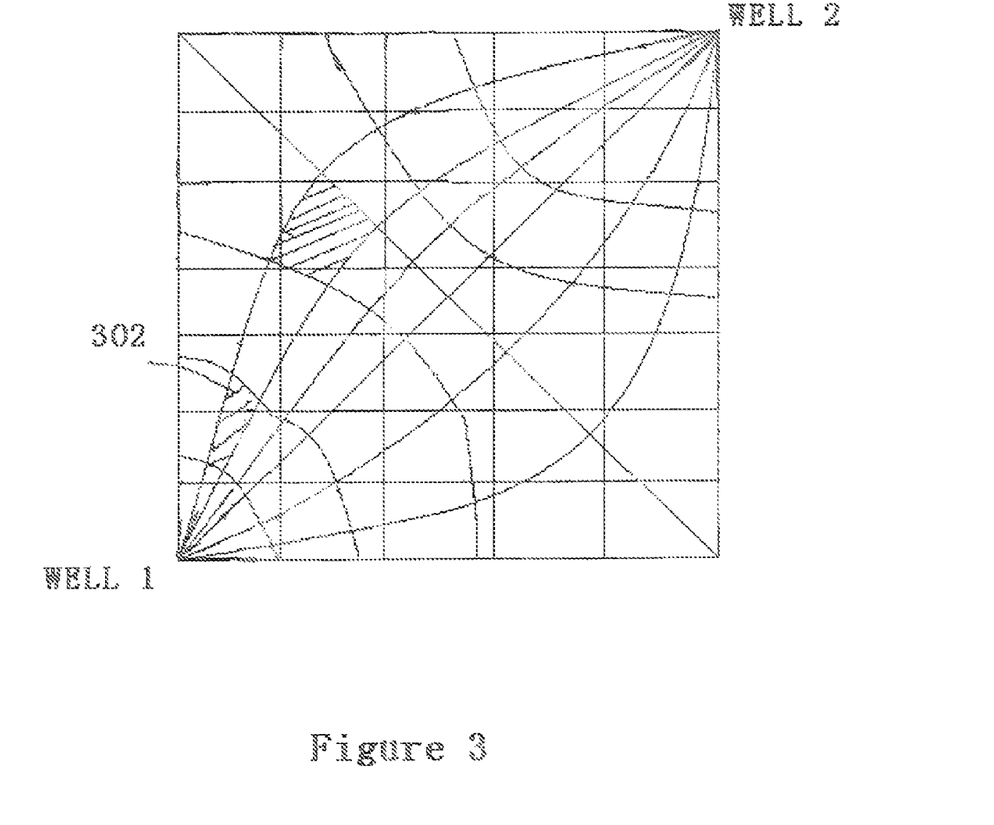
FIG. 3 illustrates a reservoir structure using the streamline simulation technique according to this invention.

We use the original reservoir data obtained from the second group of subsurface reservoir models to conduct the second simulation step. FIG. 3 illustrates a reservoir structure using the streamline simulation technique and can be used to indicate the process of construction of the streamline blocks in FIG. 2. One would identify FIG. 3 as a system with rectangular blocks embedded with a streamline system. We use original reservoir properties of first refined models to calculate the original reservoir properties of each of the streamline blocks, such as block 302, which has a location corresponding to the location of block 202 in FIG. 2. Interpolation, average, or extrapolation techniques can be used for such calculation.

Using Darcy's law, one can establish a relationship between the flow rate, pressure difference, fluid properties, and original reservoir properties along a section of a streamline such as a section indicated by each arrow 220 In FIG. 2. We define this relationship as the flow relationship. Adding the sections of the streamline flow relationship one would be able to obtain the flow relationship of the entire streamline. Adding the flow relationship of all the streamlines such as the streamlines indicted by arrows 220, arrows 230, arrows 240, etc, one would obtain the flow relationship of the entire reservoir.

In a simplified streamline system under steady state indicated by FIG. 2, the flow rate in each streamline is directly proportionate to the pressure difference between the two ends of the streamline. For example, the flow rate along streamline indicated by arrows 240 is directly proportionate to the pressure difference between well 211 and well 212. The higher the pressure difference the higher the flow rate. The flow rate of the wells such as well 211 and 212, (normally called the production rate for a production well and injection rate for an injection well), is a summation of the flow rate of all the streamlines. Thus once the properties of each of the blocks of the streamline model is established, the production rate is a direct function of the pressure difference between the wells. In other words, once a streamline model is established, one can easily calculate the production/injection rate using a pressure difference value without iteration required in normally used finite difference reservoir simulation models.

A reservoir with a production or fluid injection history normally has a set of pressure history record and production rate history record or injection rate history record. Thus once the second group of subsurface reservoir models are established, for each member model one may simply input the pressure history to calculate a simulation production rate history or simulation injection rate history. The simulation production rate history or the simulation injection rate history is then compared with the production rate record or injection rate record. We define this stage as the second comparison step. In FIG. 1, step 106 indicates the second comparison step. In the second comparison step one can identify the members of the second group simulation models that best match the production history of the reservoir. The selected members of the second comparison step that best match the production history of the reservoir are defined as the third group of subsurface reservoir models in this invention.

Figure 4:
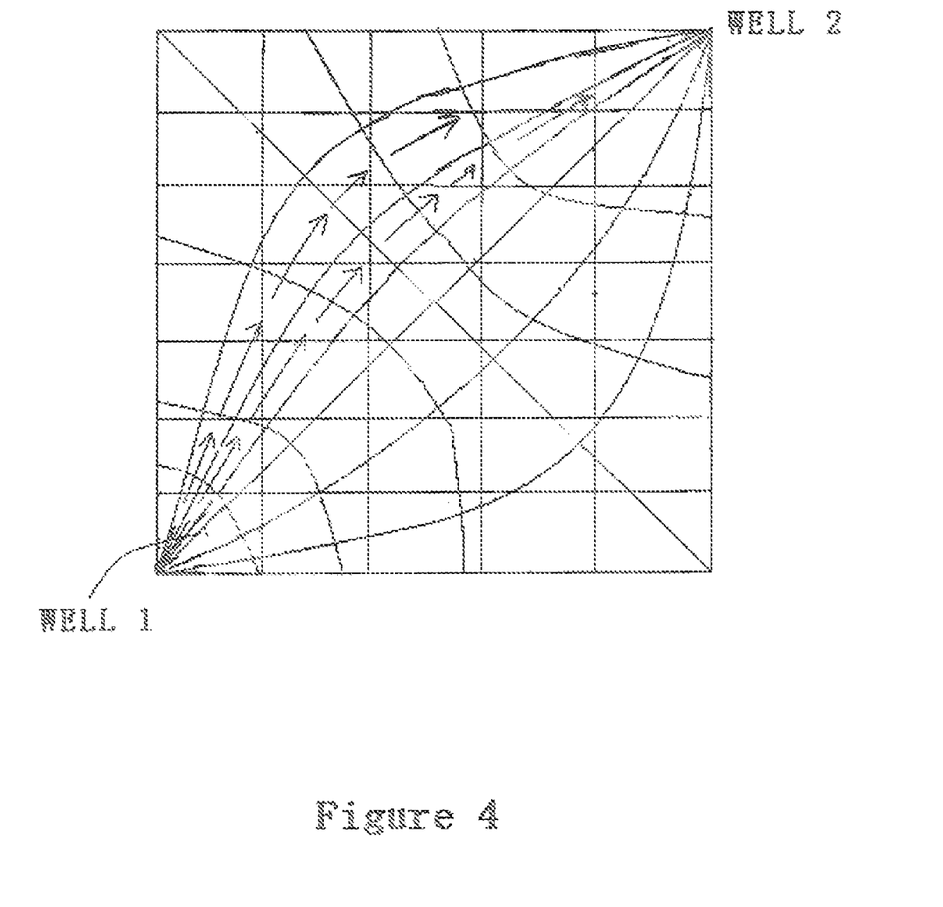
FIG. 4 illustrates a reservoir structure using resistivity simulation system according to this invention.

With the third group of subsurface reservoir models, one may use the third simulation technique to further refine the reservoir models. This step is defined at the third simulation step which is indicated by step 108 in FIG. 1. The third reservoir simulation technique can consist of reservoir resistivity simulation technique or another suitable simulation technique. FIG. 4 illustrates a reservoir structure using resistivity simulation system according to this invention. In FIG. 4 we have rectangular blocks, the block structure normally used in finite difference reservoir simulation techniques, as well as curved line blocks, block structure often used in streamline simulation. Both kinds of block structures are suitable for resistivity simulation. The following articles describing cross-well electromagnetic tomography and methods of resistivity calculation and are incorporated herein by reference: Morrison, et al: Crosshole Electromagnetic Tomography: A new technology for oil field characterization, The Leading Edge, March 1995, and Patzek, et al: Using Crosshole Electromagnetics (EM) for Reservoir Characterization and Waterflood Monitoring, 2000 SPE Permian Basin Oil and Gas Recovery Conference, SPE59529. The following patents teach the same topics and are incorporated herein by reference: U.S. Pat. No. 6,294,917 B1. to NICHOLS, E.: Electromagnetic induction method and apparatus for the measurement of the electrical resistivity of geologic formations surrounding boreholes cased with a conductive liner, and U.S. Pat. No. 6,393,363 B1 to WILT, M.: Method and apparatus for the measurements of the electrical resistivity of geologic formations employing modeling data.

Resistivity is a function of original reservoir properties such as porosity, saturation, and salinity. With the third group of subsurface reservoir models we have a set of data that reasonably represents the original reservoir properties in each block. Thus the resistivity in each block can be calculated.

FIG. 4 illustrates the reservoir system in 2 dimensions, although it should be understood the reservoir system is a 3 dimensional system. In an EM test, the transmission coil and the receiving coil are put at different depth in the wells to take different measures of resistivity.

Figure 5:
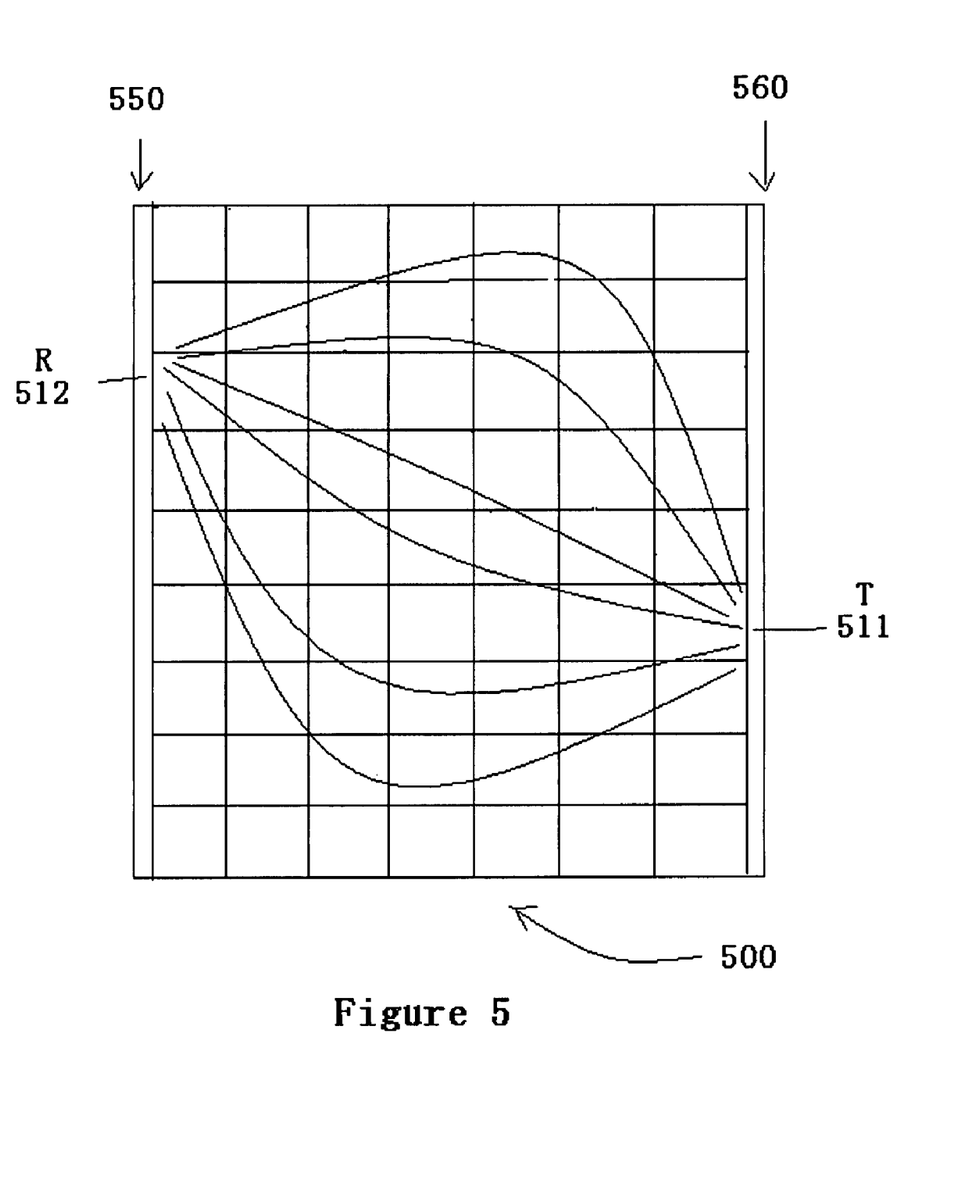
FIG. 5 illustrates a "vertical" cross sectional view of a reservoir system according to this invention.

FIG. 5 illustrates a "vertical" cross sectional view of a reservoir system used in EM tests. In FIG. 5, reservoir system 500 has two wells, 550 and 560. The word "vertical" here means the cross section is taken along the centreline of the wells. Transmission coil 511 is located in well 560 while receiving coil 512 is located in well 550. The two coils may be at different depth. Once the three dimensional system is established, we can assume the blocks form a system of circuits and the resistance between the transmission coil 511 and receiving coil 512 of the system can be calculated using the same principles described above. Resistivity calculation is a forward calculation which requires no iteration. Thus computational time to complete such simulation is relatively short.

In performing the third simulation step, we need to calculate the resistivity of each block using the original reservoir properties obtained from the third group of subsurface reservoir models. The transmission coil and the receiving coil are simulated to be located at different depth of the respective wells, and the resistance between the coils are calculated. Through this simulation process we obtain a set of forecast EM tool response, which can be considered a third set of forecast reservoir data. The third set of forecast reservoir data, or in this case, the forecast EM tool response, is compared with a third set of field-obtained reservoir data, in this case the field-obtained EM tool response. This step is defined as the third comparison step, step 109 in FIG. 1. From the process one may obtain a useful group of subsurface reservoir models that best match the reservoir properties. The useful group of subsurface reservoir models would have original reservoir properties that closely represent that of the real reservoir.

The use of resistivity simulation for the third simulation technique is for illustration purposes only, and other kinds of reservoir simulation techniques can also be used instead. The invention is about using a series of forward calculation techniques to fine tune reservoir models that best describe reality, thus allowing the reservoir engineers to conduct production planning of the reservoir. For example another set of field test results instead of EM can be used as the third simulation step, such as cross-well seismic tomography. According to the principles of this invention, it is also possible to apply further stages of simulation and comparison to further refine the models. All these variations of actual simulation models and methods are considered equivalents of the methods and systems disclosed or claimed in this patent.

In an alternative embodiment, on can add a further refining step between each comparison step and the following simulation step to further refine the models. These further refining steps are marked as 104 and 110 in FIG. 1. For example, after the second comparison step 106, we can expand the one or several members of the third group of subsurface reservoir models that are the best representatives of the actual reservoir into a more finely defined larger group of models. Step 110 in FIG. 1 indicates the second further refining step. The techniques used in such expansion can be interpolations and statistical tools. The following is an example implementation of this embodiment.

Assume that there are 5 variations in the value of porosity used in the first group of subsurface reservoir models, and the values are 0.15, 0.16, 0.17, 0.18, and 0.19. In a particular block of one member of the third group of subsurface reservoir models, the value of 0.17 was found to be the best match. Then we can assume that values between 0.165 and 0.175 are all probable values of the actual porosity. We may use the numbers 0.165, 0.167, 0.169, 0.170, 0.172, 0.174 as another set of possible porosity values for another set of models, which we define as the further refined models. For each original reservoir property in the third group of subsurface reservoir models, we use a similar refining technique.

Once the further refined models are established, we may either use the second reservoir simulation technique to obtain another set of reservoir forecast data and repeat the second comparison step to further refine the reservoir models to obtain additional members of the third group of subsurface reservoir models. The first refining step 104 is carried out similarly to that of second refining step 110.

Some of the steps of the invention can be omitted if the situation allows. For example, it is possible to omit the first simulation step or the first comparison step in some situations, for example, where the system is not large and the number of models is not too large. Because the first simulation step and the first comparison step are to reduce the number of models used in the second simulation step, the omission of the first simulation and first comparison steps are acceptable under some circumstances. If this alternative embodiment is chosen, steps 102 and 103 of FIG. 1 would be omitted.

The flowchart in the figure illustrates the architecture, functionality, and operation of possible implementations of systems and methods according to various embodiments of the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, can be implemented by special purpose hardware-based systems which perform the specified functions or acts, or combinations of special purpose hardware and computer instructions.

While the disclosure has been particularly shown and described with reference to exemplary embodiments thereof, it will be understood by those of ordinary skilled in the art that various changes in form and details may be made therein without departing from the spirit and scope of the present invention as defined by the claims. In addition, those of ordinary skill in the art appreciate that any arrangement which is calculated to achieve the same purpose may be substituted for the specific embodiments shown and that the invention has other applications in other environments.

I claim:

1. A method for evaluating underground geological properties, comprising:
   generating a first group of subsurface reservoir models using a computer;

simulating each of said first group of subsurface reservoir models using a first reservoir simulation technique to create first set of forecast reservoir data using the computer;

comparing said first set of forecast reservoir data with a first set of field-obtained reservoir data using the computer;

selecting a second group of subsurface reservoir models from said first group of subsurface reservoir models that have forecast reservoir data that best matches said first set of field-obtained reservoir data;

simulating said second group of subsurface reservoir models using a second reservoir simulation technique to generate a second set of forecast reservoir data using the computer;

comparing said second set of forecast reservoir data with a second set of field-obtained reservoir data using the computer;

selecting a third group of subsurface reservoir models from said second group of subsurface reservoir models that have forecast reservoir data that best matches said second set of field-obtained reservoir data;

simulating said third group of subsurface reservoir models using a third reservoir simulation technique to generate a third set of forecast reservoir data using the computer;

comparing said third set of forecast reservoir data with a third set of field-obtained reservoir data using the computer; and selecting a fourth group of subsurface reservoir models from said third group of subsurface reservoir models that have forecast reservoir data that best matches said third set of field-obtained reservoir data.

2. The method as described in claim 1, wherein said step of generating a first group of subsurface reservoir models comprises stochastic reservoir modeling.

3. The method as described in claim 1, wherein said first reservoir simulation technique comprises volumetric reservoir simulation.

4. The method as described in claim 1, wherein said second reservoir simulation technique comprises streamline reservoir simulation.

5. The method as described in claim 1, wherein said third reservoir simulation technique comprises electromagnetic tomography simulation.

6. The method as described in claim 1, further comprising the step of using said fourth group of subsurface reservoir models to predict future reservoir behavior and performance.

7. A system for evaluating underground geological properties comprises a computer hardware system and a computer software system, said computer software system is configured to carry out the following steps of calculation:

generating a first group of subsurface reservoir models;

simulating each of said first group of subsurface reservoir models using a first reservoir simulation technique to create first set of forecast reservoir data;

comparing said first set of forecast reservoir data with a first set of field-obtained reservoir data;

selecting a second group of subsurface reservoir models from said first group of subsurface reservoir models that have forecast reservoir data that best matches said first set of field-obtained reservoir data;

simulating said second group of subsurface reservoir models using a second reservoir simulation technique to generate a second set of forecast reservoir data;

comparing said second set of forecast reservoir data with a second set of field-obtained reservoir data;

selecting a third group of subsurface reservoir models from said second group of subsurface reservoir models that have forecast reservoir data that best matches said second set of field-obtained reservoir data;

simulating said third group of subsurface reservoir models using a third reservoir simulation technique to generate a third set of forecast reservoir data;

comparing said third set of forecast reservoir data with a third set of field-obtained reservoir data; and selecting a fourth group of subsurface reservoir models from said third group of subsurface reservoir models that have forecast reservoir data that best matches said third set of field-obtained reservoir data.

8. The system as described in claim 7, wherein said step of generating a first group of subsurface reservoir models comprises stochastic reservoir modeling.

9. The system as described in claim 7, wherein said first reservoir simulation technique comprises volumetric reservoir simulation.

10. The system as described in claim 7, wherein said second reservoir simulation technique comprises streamline reservoir simulation.

11. The system as described in claim 7, wherein said third reservoir simulation technique comprises electromagnetic tomography simulation.

12. The system as described in claim 7, wherein said computer software system is further configured to carry out the step of using said fourth group of subsurface reservoir models to predict future reservoir behavior and performance.

13. A method for evaluating underground geological properties comprising:

generating a first group of subsurface reservoir models using a computer;

simulating each of said first group of subsurface reservoir models using a first reservoir simulation technique to generate a first set of forecast reservoir data using the computer;

comparing said first set of forecast reservoir data with a first set of field-obtained reservoir data using the computer;

selecting a second group of subsurface reservoir models from said first group of subsurface reservoir models that have forecast reservoir data that best matches said first set of field-obtained reservoir data;

simulating said second group of subsurface reservoir models using a second reservoir simulation technique to generate a second set of forecast reservoir data using the computer;

comparing said second set of forecast reservoir data with a second set of field-obtained reservoir data using the computer; and selecting a third group of subsurface reservoir models from said second group of subsurface reservoir models that have forecast reservoir data that best matches said second set of field-obtained reservoir data.

14. The method as described in claim 13, wherein said step of generating a first group of subsurface reservoir models comprises stochastic reservoir modeling.

15. The method as described in claim 13, wherein said first reservoir simulation technique comprises streamline reservoir simulation.

16. The method as described in claim 13, wherein said second reservoir simulation technique comprises electromagnetic tomography simulation.

17. The method as described in claim 13, further comprising the step of using said third group of subsurface reservoir models to predict future reservoir behavior and performance.

18. A system for evaluating underground geological properties comprises a computer hardware system and a computer software system, said computer software system is configured to carry out the following steps of calculation:
  generating a first group of subsurface reservoir models;
  simulating each of said first group of subsurface reservoir models using a first reservoir simulation technique to generate a first set of forecast reservoir data;
  comparing said first set of forecast reservoir data with a first set of field-obtained reservoir data;
  selecting a second group of subsurface reservoir models from said first group of subsurface reservoir models that have forecast reservoir data that best matches said first set of field-obtained reservoir data;
  simulating said second group of subsurface reservoir models using a second reservoir simulation technique to generate a second set of forecast reservoir data;
  comparing said second set of forecast reservoir data with a second set of field-obtained reservoir data; and
  selecting a third group of subsurface reservoir models from said second group of subsurface reservoir models that have forecast reservoir data that best matches said second set of field-obtained reservoir data.

19. The system as described in claim 18, wherein said step of generating a first group of subsurface reservoir models comprises stochastic reservoir modeling.

20. The system as described in claim 18, wherein said first reservoir simulation technique comprises streamline reservoir simulation.

21. The system as described in claim 18, wherein said second reservoir simulation technique comprises electromagnetic tomography simulation.

22. The system as described in claim 18, wherein said computer software system is further configured to carry out the step of using said third group of subsurface reservoir models to predict future reservoir behavior and performance.

* * * * *